J. A. SCOTT.
GRAIN SAVING DEVICE FOR THRESHING MACHINES.
APPLICATION FILED JULY 31, 1916.

1,275,770.

Patented Aug. 13, 1918
3 SHEETS—SHEET 1.

INVENTOR
John A. Scott,
BY James A. Walsh,
ATTORNEY

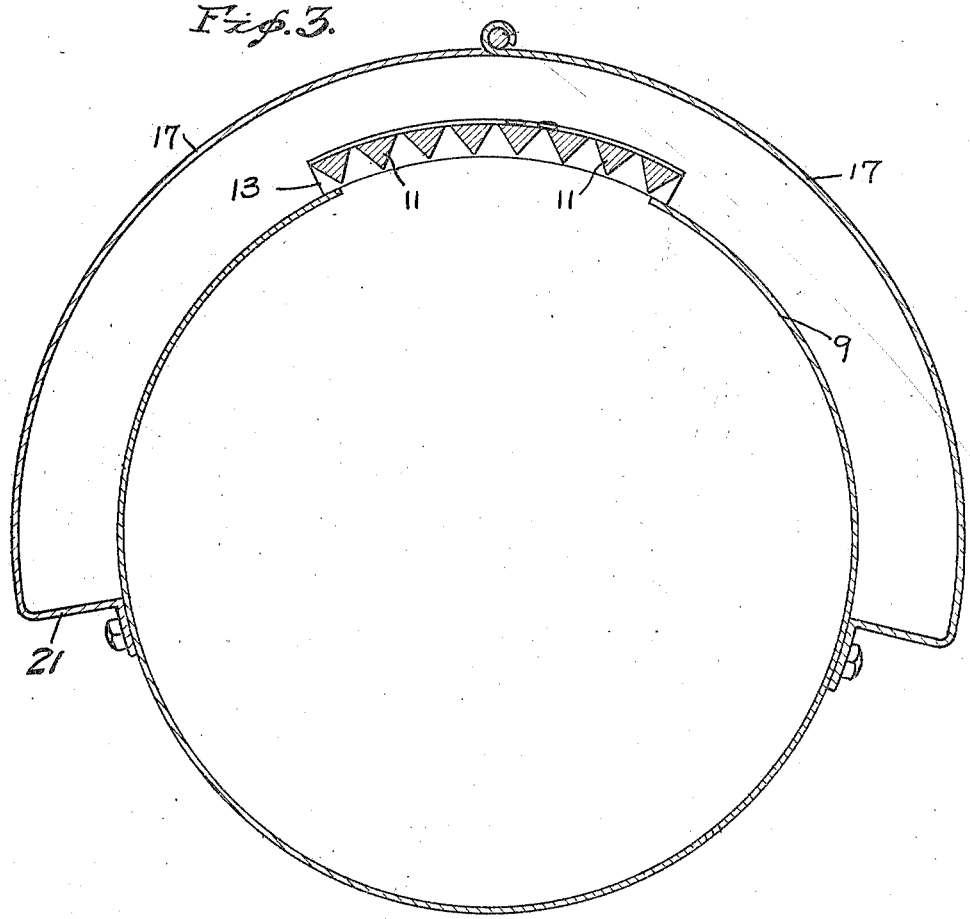

J. A. SCOTT.
GRAIN SAVING DEVICE FOR THRESHING MACHINES.
APPLICATION FILED JULY 31, 1916.
1,275,770.
Patented Aug. 13, 1918.
3 SHEETS—SHEET 3.
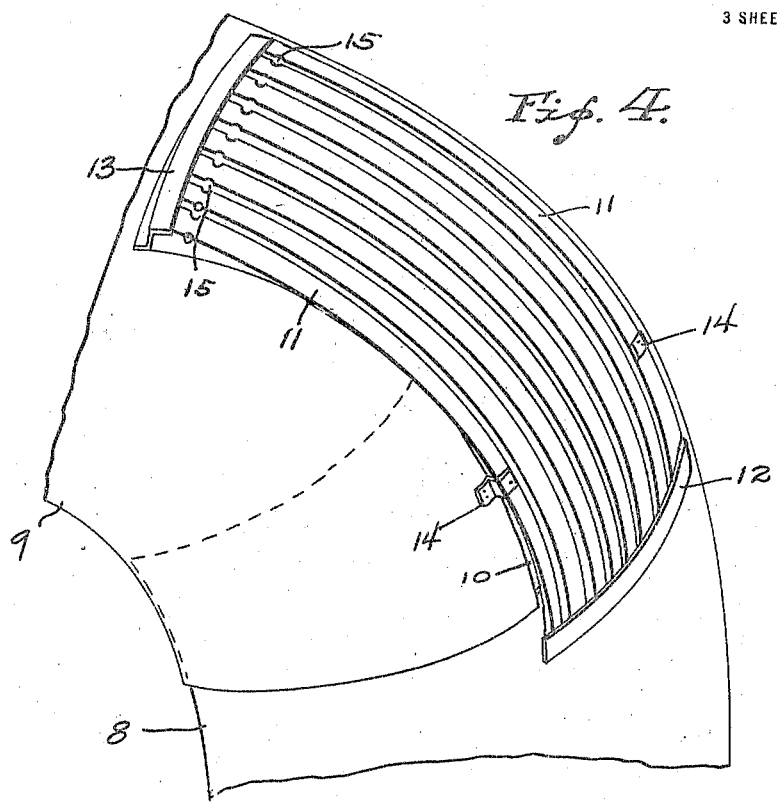
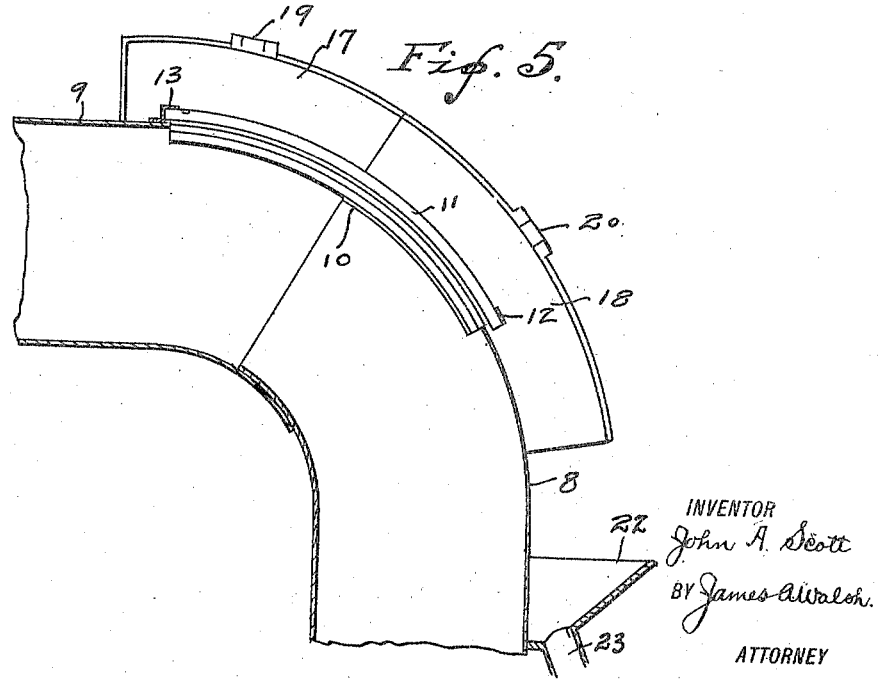
INVENTOR
John A. Scott
BY James A. Walsh
ATTORNEY

UNITED STATES PATENT OFFICE.

JOHN A. SCOTT, OF OKLAHOMA, OKLAHOMA.

GRAIN-SAVING DEVICE FOR THRESHING-MACHINES.

1,275,770.  Specification of Letters Patent.  Patented Aug. 13, 1918.

Application filed July 31, 1916.  Serial No. 112,247.

*To all whom it may concern:*

Be it known that I, JOHN A. SCOTT, a citizen of the United States, residing at Oklahoma city, in the county of Oklahoma and State of Oklahoma, have invented certain new and useful Improvements in Grain-Saving Devices for Threshing-Machines, of which the following is a specification.

In the operation of threshing machines it is well understood that a considerable amount of loose grain and unthreshed heads of grain is discharged with the straw from the machine into the wind stacker hopper forming a part of the rear thereof, and withdrawn therefrom by the action of the stacker fan and ejected through an adjustable stacker pipe into a stack or otherwise, where such grain becomes wasted. This waste or loss is material where the wind stacker is not provided with means for trapping such grain in the hopper before it reaches the influence of the fan, especially so when the separating mechanisms of the threshing machine are not suitably adjusted for efficiently handling the straw. The heads of grain entering the stacker fan are threshed thereby, so that with the loose grain mingled with the straw a considerable amount is carried upwardly therewith through the stacker pipe or chute, and, being heavier than straw, the blast to a certain extent separates the grain therefrom. As this material is forced upwardly through the chute at great velocity and must follow the turn or elbow thereof, it will be understood that the grain follows the upper side of the chute and a large proportion of it is driven against the inner side of the elbow, and it is my object to so devise such elbow as to permit the discharge therethrough of such loose grain, after which I trap the same and return it to a receptacle or the threshing machine to be recleaned or otherwise treated, and thus save the grain which would otherwise become wasted and a total loss.

Figure 1:
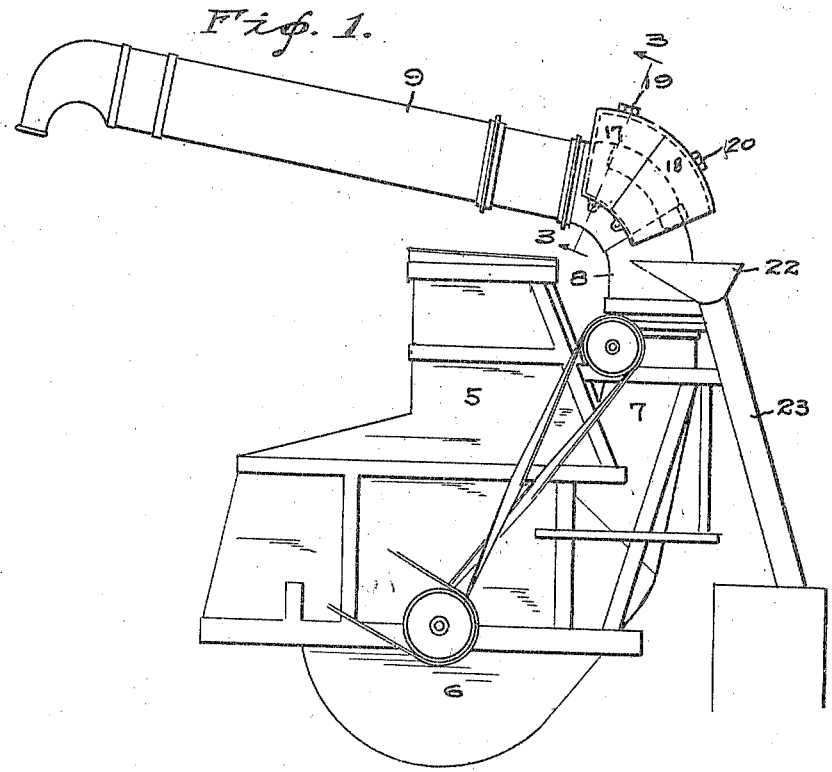
Figure 2:
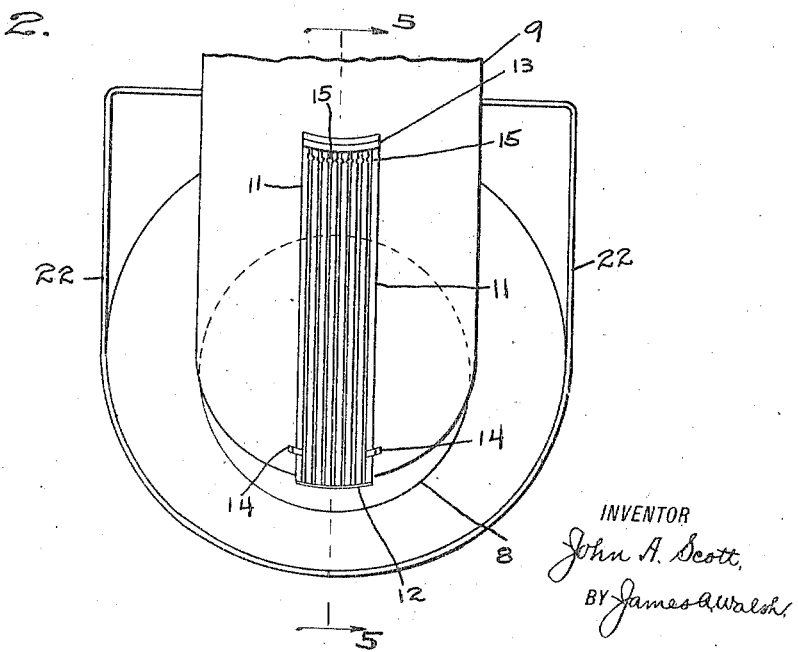

In the accompanying drawing, which forms a part hereof, Figure 1 is a side elevation of a wind stacker showing my improvement applied to the pipe or chute at the turn or elbow thereof; Fig. 2 a plan of said elbow; Fig. 3 a detail sectional view transversely of said elbow showing my arrangement of separating bars forming my improved trap; Fig. 4 a perspective of said trap, and Fig. 5 a detail sectional view of the elbow with my improvement applied thereto.

In said drawings the portions marked 5 indicate the straw chamber, and 6 the fan which withdraws the material from said chamber and ejects it through the boot, 7, and thence out through the stump, 8, and chute, 9, all as is common and well known.

The upper side of the stump, 8, and the chute, 9, at the point where they are telescopically connected, or what is commonly termed the elbow, I form with openings which register with each other, indicated at 10 in Fig. 2. Over said openings I provide a grain trap consisting of a series of bars, 11, preferably triangular in cross section, which are secured to binding plates, 12 and 13, the upper plate 13 being of a form which may be readily riveted or otherwise secured to chute, 9, the outer bars at each side being held by clips, 14, struck up from the chute material, or otherwise. These bars 11, as stated, are preferably triangular in cross section, and arranged in close proximity to each other so that a slight space is left between each, and at their upper ends each bar has a substantially semicircular opening, 15, cut therein, so that an increased separation is provided between the bars at this point for a purpose which will hereinafter appear. This trap, when thus assembled, may be readily installed, and it is of a length which permits it to overlap the opening in stump, 8, and extends considerably below the same in order that the openings in the chute and stump may be at all times spanned thereby regardless of the inclination to which the chute may be adjusted.

Above said trap I place a hood or deflector, preferably comprising two members composed of the segmental sections, 17 and 18, at opposite sides of the chute, and hinge them together, at 19 and 20, so that they may be raised and lowered. The lower sides, 21, of these sections are turned inwardly toward the chute and constitute conveyers, which communicate with a hopper or funnel, 22, or other suitable device for conveying grain thereinto to be delivered into a discharge pipe, 23, or otherwise.

In operation, as indicated, material such as straw and the like, passing into the stacker fan 6 is discharged upwardly thereby at great velocity through the boot 7, and thence through the stump 8 and chute 9. As the material strikes the upper side of the elbow, loose grain is driven therefrom between the bars constituting the grain trap, and, striking the deflector or hood above, rebound and fall to either side into the conveyers 21, by which they are delivered to hopper 22, and pass through discharge pipe 23 into a receptacle, or said pipe may be led to a point of discharge in the threshing machine so that such grain may be delivered thereinto and recleaned. In actual practice I have found that by forming the separating bars triangular in cross section as indicated in Fig. 3, the spaces therebetween are larger at the under sides and converge upwardly, which arrangement produces guides for catching and directing grain upwardly, and as these bars are flat on top and the spaces at that side being very limited, any grain which falls thereon or which rebounds from the deflector above will travel toward either side, as the upper surface of these bars produces in effect a curved floor through which the loose grain is prevented from returning by reason of the air blast passing beneath. When straws are forced upwardly between the bars they are driven forwardly by the air blast, and when they reach the openings between the upper ends of said bars, they are pulled downwardly into the mass of material by the action of such blast, and clogging or choking of the trap is thus prevented.

In this manner I have demonstrated that a considerable amount of grain can be saved which has heretofore been wasted. As the tendency of the blast is to drive the material against the elbow at the point where my improved trap is installed, and by reason of the slight openings between the bars and the deflector or hood, the direction of the air blast does not become disturbed or dissipated at the point mentioned.

I claim as my invention:

1. In a grain saving device for threshing machines, two pipe sections telescopically connected and having openings in their upper sides registering with each other, and a grain trap carried by one of said sections and sliding over the opening in the other of said sections.

2. In a grain saving device for threshing machines, a straw chamber, a stacker fan communicating therewith, a discharge pipe leading from said fan and having an opening in its upper side, said pipe having a discharge outlet at its outer end, means over said opening through which grain separated from other material delivered from said fan is discharged and intercepted from passing to the discharge outlet of said pipe, and means adjacent said separating means for capturing said separated grain.

3. In a grain saving device for threshing machines, a straw chamber, a stacker fan communicating therewith, a discharge pipe leading from said fan and having an opening in its upper side, a series of bars spanning said opening and spaced apart to permit the discharge of grain therebetween, said bars having openings between their ends to permit the withdrawal of straws therethrough, and means for securing said bars over said opening.

4. In a grain saving device for threshing machines, a fan, a boot communicating with said fan, a chute communicating with said boot and provided with an elbow having an opening in its upper side, said chute being adapted to discharge material at its outer end, and a grain trap in said opening by which grain separated from other material is intercepted and through which said grain is discharged and prevented from passing to the outer end of said chute.

5. In a grain saving device for threshing machines, a fan, a chute embodying a discharge outlet in its outer end communicating with said fan and provided with an elbow having an opening in its upper side, a grain trap in said opening by which grain separated from other material is intercepted and through which said grain is discharged and prevented from passing to the outer end of said chute, a deflector over said trap for deflecting such grain, means beneath said deflector for receiving said grain, and means for conveying said grain from said receiving means.

6. In a grain saving device for threshing machines, a curved pipe having an opening in its upper side, a series of spaced bars in said opening, an adjustable deflector supported on said pipe in proximity to said bars for deflecting grain passing therebetween, and means for receiving and conveying such grain from said deflector.

7. In a grain saving device for threshing machines, a curved pipe having an opening in its upper side, and a grain trap in said opening comprising a series of spaced triangular shaped bars having openings therebetween through which straw is withdrawn.

8. In a grain saving device for threshing machines, a pipe having an opening in its upper side, and a grain trap in said pipe comprising a plurality of converging guides along which straw may travel in its movement through the pipe and by which grain may be separated from such straw.

In testimony whereof I affix my signature in presence of two witnesses.

JOHN A. SCOTT.

Witnesses:
 WALTER M. SMITH
 CLYDE FOSTON.